May 21, 1935. H. O. HEM 2,001,905
WEIGHING SCALE
Filed Dec. 23, 1932 4 Sheets-Sheet 1
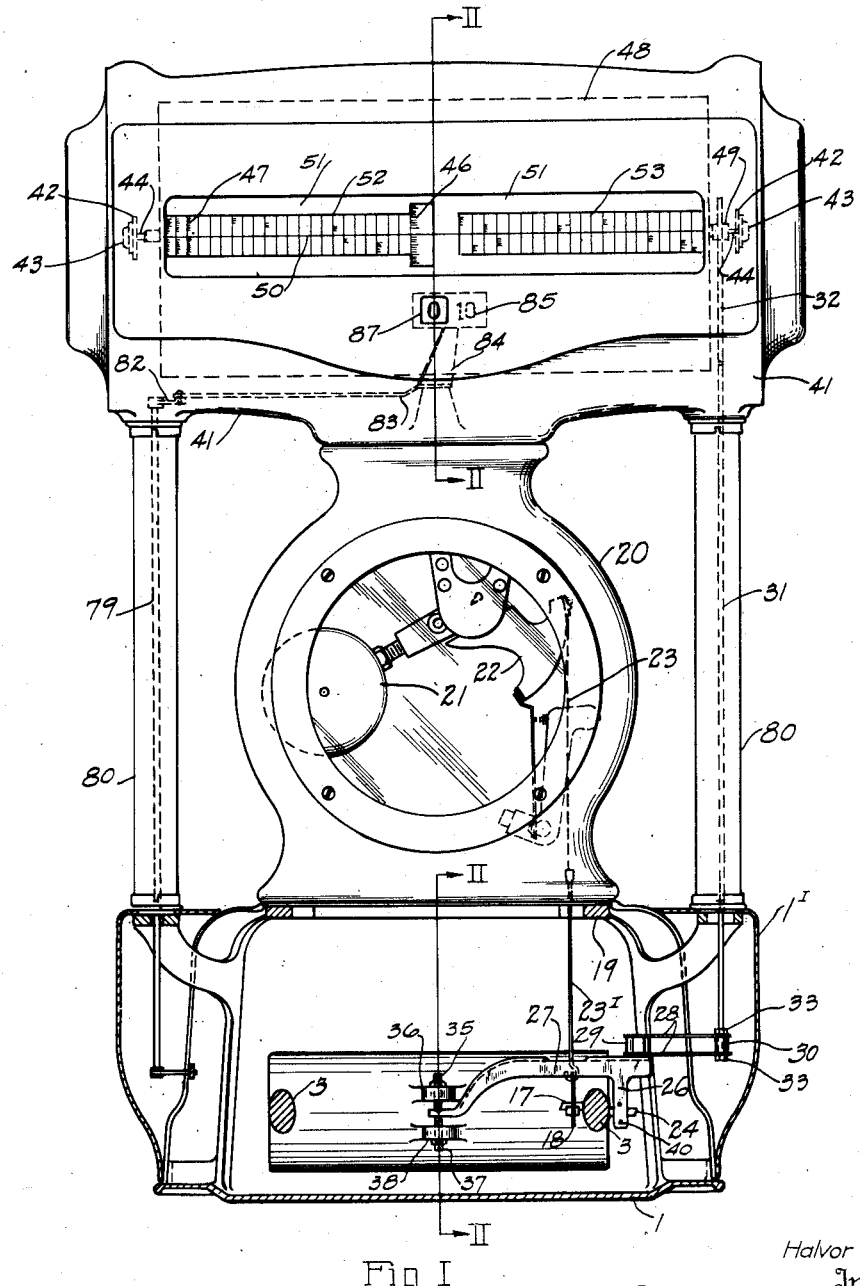
Fig I
Halvor O. Hem
Inventor
By Marshall
Attorney

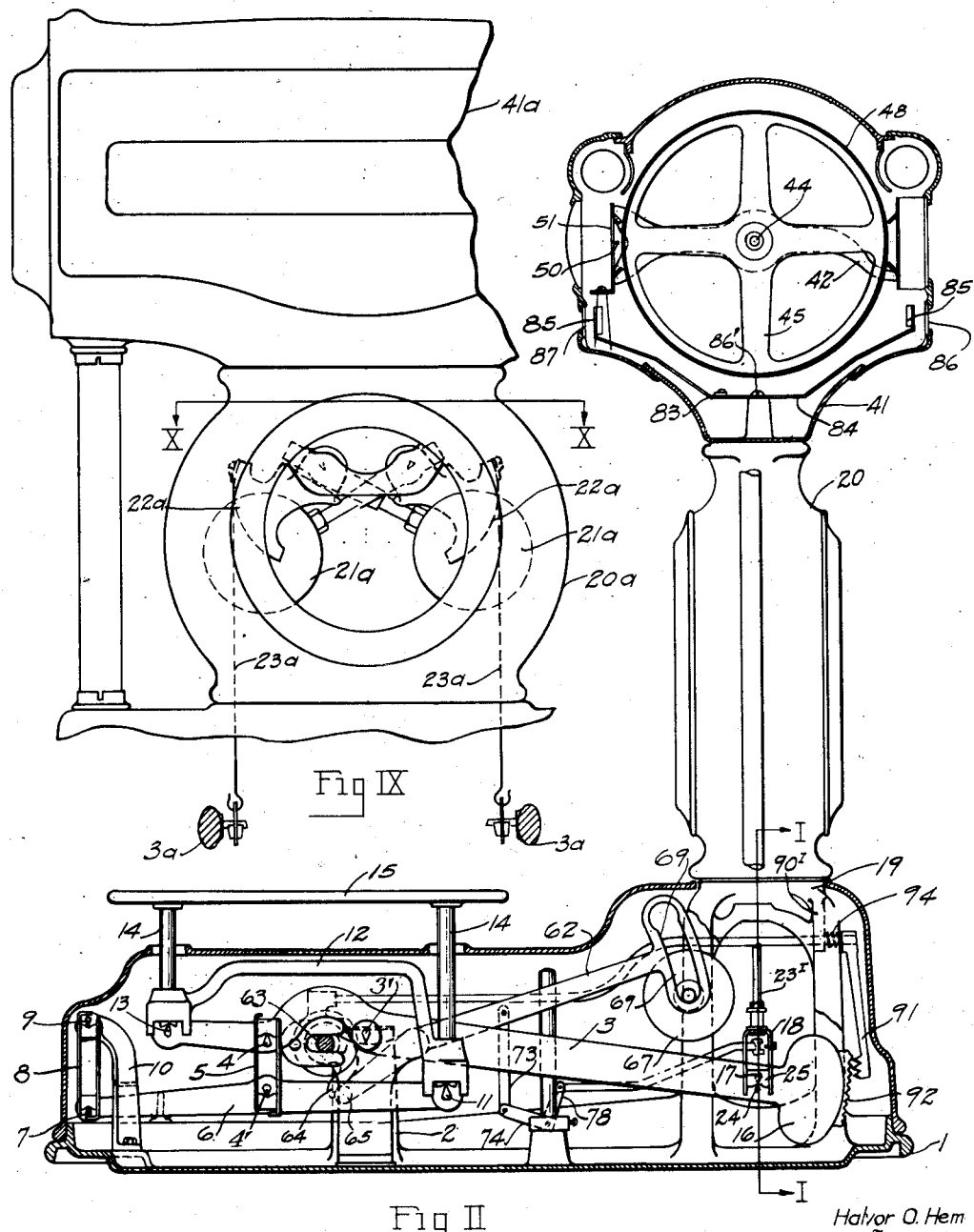

May 21, 1935. H. O. HEM 2,001,905
WEIGHING SCALE
Filed Dec. 23, 1932 4 Sheets-Sheet 3
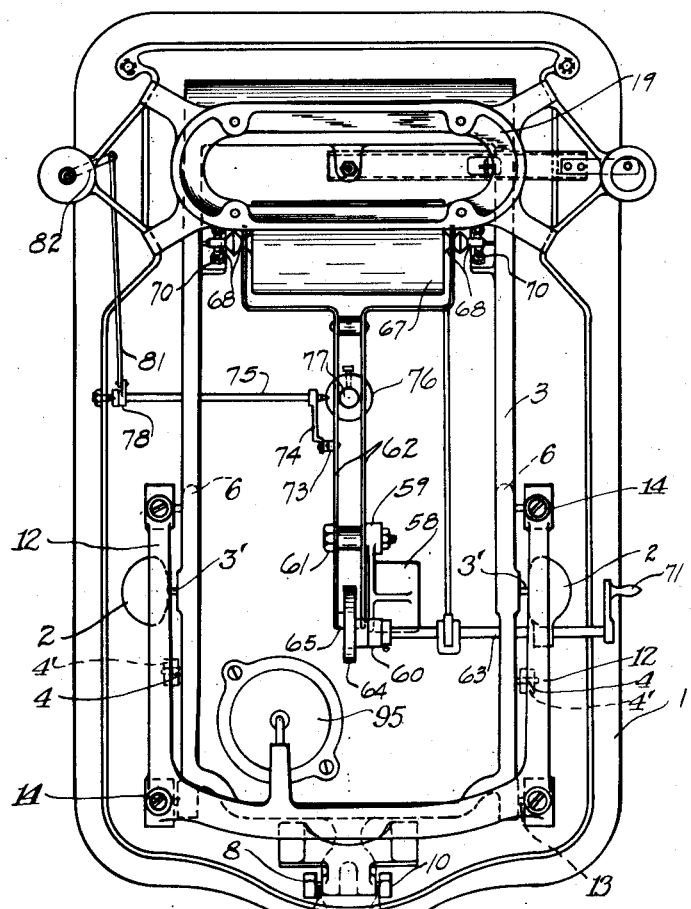
Fig III
Fig VIII
Fig VII
Halvor O. Hem.
Inventor
By C. W. Marshall
Attorney May 21, 1935.  H. O. HEM  2,001,905
WEIGHING SCALE
Filed Dec. 23, 1932   4 Sheets-Sheet 4
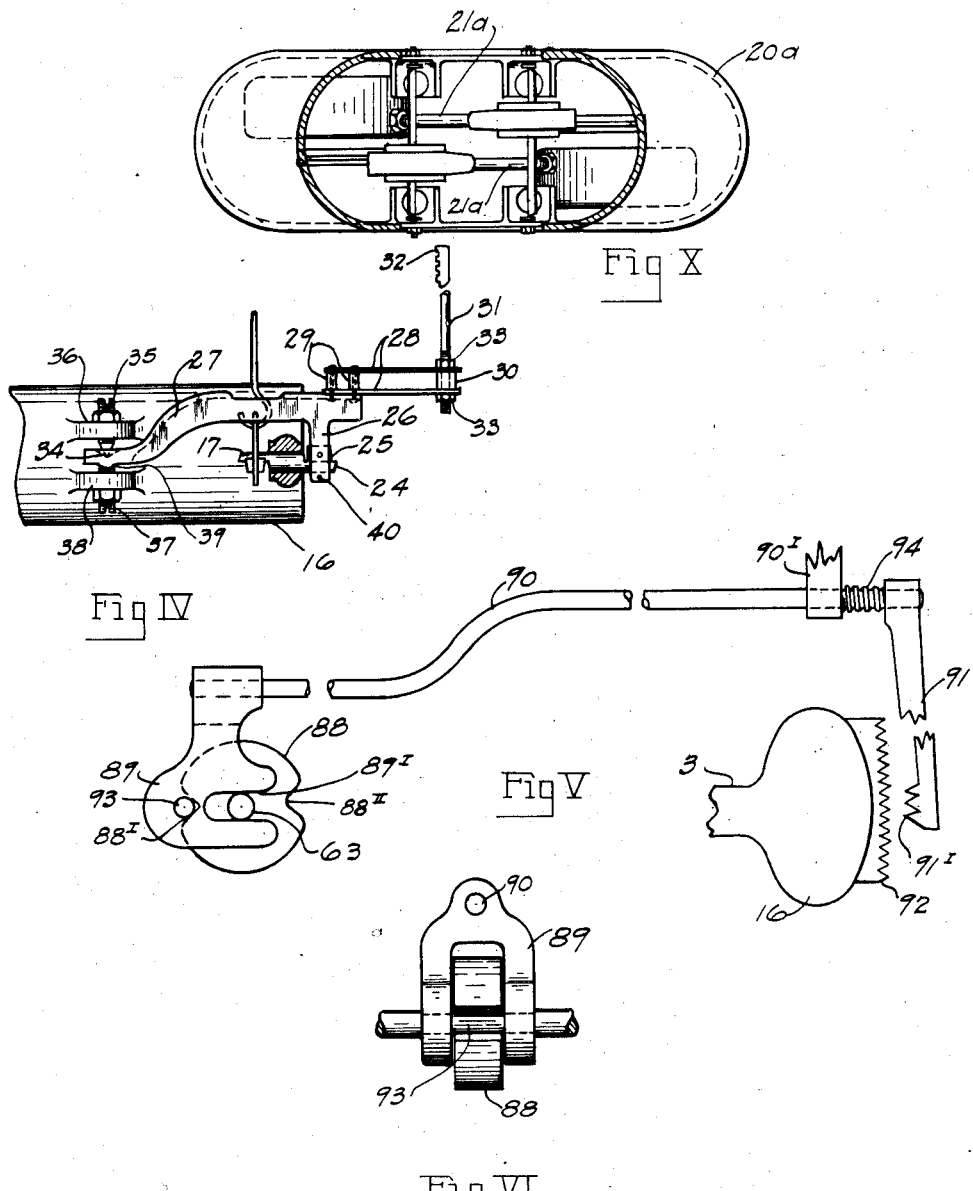
Halvor O. Hem.
Inventor
By CC Marshall
Attorney Patented May 21, 1935

2,001,905

UNITED STATES PATENT OFFICE 2,001,905

WEIGHING SCALE

Halvor O. Hem, Toledo, Ohio, assignor to Toledo Scale Manufacturing Company, Toledo, Ohio, a corporation of New Jersey Application December 23, 1932, Serial No. 648,540

9 Claims. (Cl. 265—37)

This invention relates to improvements in weighing scales and particularly to scales for use in retail shops. In scales of this type, it has been found desirable for the indicating chart to have a relatively small automatic indicating capacity so that the subdivisions of the weight and the computed prices may be widely spaced. This permits the indications to be read with a greater degree of accuracy. It is usually sufficient that the automatic weighing and computing capacity is ample to weigh the majority of drafts, which are below ten pounds. Drafts of greater weight than ten pounds amount to only two or three per centum of the total in the present day food shop.

The principal object of this invention is therefore the provision of improved means whereby the weighing capacity of a scale may be increased.

Another object is the provision of improved means whereby the increase in the weighing capacity is automatically indicated, simultaneously to both the merchant and his customer.

Another object is the provision of an improved lever system for scales of the type hereinafter described.

Still another object is the provision of improved manipulative load counterbalancing means.

Another object is the provision of an improved unit weight counterbalancing mechanism.

A still further object is the provision of improved means for depositing and removing such unit weight with a minimum of effort and a minimum of shock to the weighing mechanism.

A further object is the provision of improved means for transmitting the reciprocatory motion of the lever mechanism to the indicating mechanism to convert it into rotative motion.

A still further object is the provision of an improved counterbalancing mechanism.

Other objects and advantages will be apparent from the following description in which reference is had to the accompanying drawings illustrating preferred embodiments of my invention and wherein similar reference numerals designate similar parts throughout the several views.

In the drawings:—

Figure I is a front elevational view of a scale embodying my invention; the base housing being sectioned along the lines I—I of Figure II.

Figure II is a side elevational view of the scale, the base and indicating housings are sectioned along the lines II—II of Figure I, other parts are broken away.

Figure III is a plan view of the base mechanism, the housing and platform being removed.

Figure IV is an enlarged fragmentary view showing the rack foot and its attachment to the lever in detail.

Figure V is a fragmentary enlarged side elevational view of the lever locking mechanism.

Figure VI is an enlarged fragmentary end view of the operating parts of the locking mechanism.

Figure VII is an enlarged view of the compression stirrup.

Figure VIII is a fragmentary enlarged perspective view of the price indicating plate and showing a fragment of the chart.

Figure IX is a fragmentary front elevational view of a scale showing a modification of the embodiment of my invention, and Figure X is an enlarged plan view of the modification, sectioned substantially along the lines X—X of Figure IX.

Referring to the drawings in detail, the base 1 of the scale is preferably a rigid iron casting having integral fulcrum stands 2 upon which a main lever 3 is mounted with its fulcrum pivot $3^1$. The main lever 3 being of the first order is also provided with power pivots 4 from which, by means of a bearing loop 5, a short lever 6 of the third order is suspended by its power pivots $4^1$. In spaced relation with these pivots $4^1$ fulcrum pivot 7 and load pivots 11 extend laterally outward at each end from the lever. The pivot 7 engages a compression stirrup 8 which bears against a pivot 9 fixed in a bracket 10. This bracket is adjustably mounted on the base and in balancing the scale, it may be moved to the proper position and locked by bolts and pinned in place. The compression stirrup 8 comprises two triangular side plates $8^1$ (Fig. VII) between which three V-grooved bearing blocks $8^{11}$ are fixed, these engage the pivots 7 and 9 respectively. The stirrup 8 is designed to prevent lateral movement of the short lever 6. One end of a load spider 12, rests upon the pivots 11, fixed in the short lever 6, the other end resting upon the pivots 13 fixed in the main lever 3. Posts 14 are threaded in the four corners of the spider 12 extending upwardly, supporting a load receiving platter 15. The other end of the main lever 3 is provided with a heavy enlarged portion 16 which substantially counterbalances the weight of the spider and platter. Adjacent this enlarged portion and fixed in the arm of the lever 3 is a pivot 17, adapted to engage stirrup 18.

The levers 3, 6 and the spider 12 are designed to lie substantially above each other in common planes and to define a substantially open rectangular center, thus providing a space on the base 1 for the positioning of other mechanisms. This lever and spider constructure permits the base mechanism to occupy a smaller space, and its disposition permits ready access for cleaning and servicing.

A four-legged stand 19, which in the illustrated embodiment is an integral part of the base 1, although it may be a separate part and fastened to the base, supports a housing 20. Suitable bearings in the interior of this housing pivotally support a load counterbalancing pendulum 21. This pendulum includes an eccentrically mounted sector 22 which is adjustably secured to the pendulum stem. A metallic ribbon 23 overlies the arcuate surface of the sector and is fastened to its upper end. The other end of this metallic ribbon is fastened to the stirrup rod 23¹ from which the stirrup 18 engaging the pivot 17 in the lever 3, is suspended. Since the enlarged portion 16 of the lever 3 is sufficiently heavy to normally counterbalance the weight of the spider 12, the commodity receiver 15 and also to overbalance the pendulum 21, holding the latter in an inclined position as shown in Figure I, the action of gravity on a commodity placed on the platter 15 depresses the lever ends on which the spider is resting, thus counterbalancing a proportional amount of the force exerted by the enlarged portion 16 of the lever 3 allowing this enlarged weighted end to rise, permitting the pendulum 21 to descend from its elevated zero position until equilibrium is established.

A knife edge 24 is an integral portion of the pivot 17 which extends through an arm of the lever 3, (Figure IV) this knife edge is in colinear alignment with the knife edge of the pivot 17 and supports a bearing 25 mounted between arms 26 of a rack foot 27. This rack foot further comprises a pair of flexible shock absorbing plates 28 which are riveted to the end of the foot 27 and spaced from each other by spacers 29 and 30. Extending through the shock absorbing plates 28 and the spacer 30 is upwardly extending rack rod 31, this rod is adapted to be locked in proper position by the nuts 33. The other end of the rack foot 27 curves downwardly so that the apex of a conical depression 34 formed therein lies on a horizontal plane which touches the knife edges 17 and 24. A pair of lip-like projections 36 and 38 extend laterally from the enlarged portion 16 of the lever 3, the projection 36 lying above and the projection 38 below the end of the rack foot. Through the upper lip-like projection a cone-pivot is threaded, the conical end entering the depression in the rack foot and forming a fulcrum against which the rack foot bears due to the weight of the rack 32 and rod 31 on the opposite side of the bearing 25. To prevent disengagement, due to shocks caused by a sudden removal of a load, or other causes, a screw 37 having a flat end is threaded through an aperture in the lip-like projection 38. The flat end of the screw 37 is so adjusted that it does not contact the end of the rack foot 27 in which the conical depression 34 is located except when due to a shock there is a tendency for the bearing 25 to become disengaged from its pivot 24. As a further safeguard to effectively prevent disengagement of these parts, the arms 26 are extended below the back of the pivot so that a pin 40 may pass therethrough. As it is essential that the rack rod 31 and the rack 32 extend upwardly in a vertical position, the screws 35 and 37 form an adjustment whereby the rack foot 27 may be tilted to effect the correct position of the rack rod.

Surmounting the housing 20, which supports and houses the load counterbalancing pendulum 21, is a casing 41. Two horizontally disposed bars 42 are fastened to flanges on either end in the interior of the casing which support ball bearings 43 in which the ends of a chart shaft 44 are rotatably mounted. A plurality of skeleton frames 45 are fastened to this chart shaft, these are surrounded by a cylinder 46 or light material on which the weight and value indicia 46 and 47 respectively are printed, etched or otherwise marked.

When a load placed on a commodity receiver disturbs the existing equilibrium and causes the heavy section 16 of the lever 3 to rise, the rack which is fulcrumed on it, translates this reciprocatory motion, by the co-operation of a pinion 49 which is secured to the shaft 44, into rotation of the chart. The chart is thus revolved through an angle which is proportional to the weight of the load, and an indicating line or index 50 which is stretched immediately in front of the chart 46 co-operates with the indicia on the chart to invariably indicate the weight and value of the commodity. A frame 51 having openings 52 and 53 through which the indicia on the chart are visible, is stationed immediately in front of the index 50. The top edges 54 and 56 and the lower edges 55 and 57 of the frame have the prices per pound or other unit values marked thereon, which form factors in calculating the total values of commodities counterbalanced by the automatic weighing mechanism. The edges are bent inwardly, towards the chart, for the purpose of facilitating the illumination of the figures printed thereon and for ease of reading them.

The mechanism so far described will automatically indicate the weight and value of any commodity placed on the platform which is within the automatic counterbalancing capacity and unit value range. In order to increase the weighing capacity of the scale without reducing the movement of the chart for each unit of weight, manipulative counterbalancing capacity increasing means are provided. These capacity increasing means comprise a stand-like bracket 58 having bifurcated ends 59 and 60. It is securely bolted to the base 1 and into an aperture in the end 59, a fulcrum bolt 61 is threaded upon which a unit weight operating lever 62 is fulcrumed. This lever is made from punched and formed sheet material and is provided with a forked end. The arms which form the fork are provided with arcuate slots 69 which are substantially in a vertical position therein. These arcuate slots engage trunnions 68 which extend from a substantially cylindrical unit weight 67. The other end of this lever 62 has a roller 65 mounted between its punched arms. To receive the unit weight 67 the lever 3 is provided with inwardly extending weight rests 70. These rests are disposed adjacent the heavy end of the lever at a distance from its fulcrum so that the unit weight itself may be of small size and yet counterbalance a considerable weight on the platform of the scale. The operation of these capacity increasing means is as follows. A shaft 63 which extends through apertures provided respectively in the end 60 of the bracket 58 and the bracket 2 is provided with a crank 71 secure to that portion of the shaft 63 which extends beyond a base cover 11 which resting on the base effectively encloses and protects the base mechanism. The other end of the shaft 63 has fastened to it a cam 64 which is adapted to engage the roller 65 in the lever 62 which when turned by the crank 71 permits the bifurcated end of the lever to be lowered and deposit the trunnions 68 of the unit weight 67 on the weight leads 70. In the embodiment herein shown the weight of the unit weight is so calculated that it counterbalances a load equal to the automatic counterbalancing capacity of the scale so that when assuming that the automatic capacity of the scale is 10 pounds, a 10-pound weight on the platter has revolved the chart to its maximum load position its deposition on the lever causes the chart to be revolved into its original zero position so that loads having twice the weight of the automatic capacity of the scale may be weighed.

Since the value computations on the chart in this embodiment of my invention are not increased when the weighing capacity of the scale is doubled I have provided the computed values of all the unit prices at the maximum capacity of the chart on the edges 54 and 56 of the frame 51 so that the operator of the scale by the simple addition of this value plus the value indicated by the chart may readily determine the total cost of a load when the capacity is manipulatively augmented.

Serious errors would arise, should the merchant forget to add either the weight or the value of the ten pounds offset by the unit weight, therefore, means have been provided to indicate automatically and reliably when this addition should be made. Since the position of the lever 62 is always in fixed relation to the position of the unit weight, these indicating means are actuated by it. A connecting link 73 is pivoted to the long arm of the lever 62, its other end being connected to a crank arm 74 fastened to a crank shaft 75. This crank shaft is journaled between an integral portion of the base 1 and a collar 76 which surrounds an upwardly extending pin 77 studded into the base and which also serves to guide the lever 62 and prevent its lateral displacement. A second crank arm 78 is secured to the other end of the crank shaft 75 and is connected by a member 81 and a crank arm 82 to a vertically disposed rod 79, extending through one of the protecting tubes 80 which connect the base housing 1¹ and the casing 41. The other protecting tube 80 similarly furnishes a passage for the rack rod 31. The upper end of the rod 79 (Figure I) is provided with a horizontally extending crank arm 82 and connected by a member 83 to a two-armed member 84 pivoted by screw 86¹ underneath and straddling the chart 48 within the casing 41. Each of the arms of the member 84 has a flash or target 85 which bear characters denoting the number of pounds offset by the unit weight 67 that is, the amount which must be added to the amount indicated by the chart. This indication is readily visible through windows 86 and 87 in the casing 41 on the customer's and merchant's sides respectively when the unit weight is deposited on the rests of the lever 3. It will be readily seen that the mechanism so far described and illustrated is well adapted to efficiently and accurately indicate the amount to be added to the chart indication and thus prevent financial losses and loss of business prestige.

For a further safe-guard against errors and losses, a compulsory locking mechanism is provided. This mechanism automatically locks the weighing mechanism when the position of the unit weight is disturbed and releases it only after the unit weight is deposited properly on the lever 3 or is freely disengaged from it. A disc 88 having kerfs 88¹ and 88¹¹ (Figures V and VI) is secured to the unit weight operating shaft 63. A bifurcated member 89 is adapted to straddle the disc 88. The sides of the bifurcated member 89 are provided with slots 89¹ which straddle the shaft 63 and prevent the member 89 from being displaced. One end of a substantially horizontally extending locking rod 90 is fixed in an upwardly extending portion of the bifurcated member 89, the other end passes through an aperture in a lug 90¹ depending from the four-legged stand 19. A locking member 91, equipped with a series of teeth 91¹ is fastened to the end of the locking rod 90, and these teeth are adapted to engage teeth formed in a plate 92 fastened to the enlarged counterbalancing portion 16 of the lever 3. A compression spring 94 is interposed between the lug 90 and the locking member 91 and constantly urges the locking member 91 out of engagement with the teeth of the plate 92. When the shaft 63 is turned to deposit the unit weight on the lever, for the purpose of increasing the weighing capacity of the scale, the disc 88 which is fastened to it, revolves with it. A pin 93 which extends between the bifurcation of the member 88 which in the unlocked position rests within the kerf 88¹ is forced out by this movement, and the horizontally extending locking rod 90 being attached to the bifurcated member 89 is thus forced inwardly until the teeth on the member 91 engage the teeth on the plate 92. This effectively prevents any movement of the lever 3 until the disc 88 has revolved through 180 degrees and the pin 93 urged by the compression spring 94 enters the kerf 88¹¹. Since it takes a revolution through 180 degrees to deposit or remove the unit weight 67 on the lever 3, it will be seen that no weighing operations can be performed unless the unit weight is in the proper position. A dash pot 95 serves to damp the vibrations of the mechanism.

A modified form of my improved device is shown in Figure IX. In this embodiment two overlapping pendulums 21a are mounted on suitable bearings in the housing 20a. They are mounted so as to swing adjacent each other in opposite directions. Sectors 22a form adjustable parts of these pendulums. These are eccentrically fulcrumed and have an arcuate surface and are connected to the pivots in the lever 3—a by metallic ribbons 23a which are fastened to the upper end of the sectors and overlie their arcuate surfaces. Being directly connected to the lever 3, and acting in opposed directions errors due to an out-of-level position of the scale are automatically prevented. When the scale is in an out-of-level position, in the plane of the movement of the pendulum, the weight moment of one of the counterbalancing pendulums 21a decreases, but automatically the moment of the other pendulum 21a increases an equal amount so that the continued counterbalancing moment of the pair remains constant.

It is obvious that the scale hereinbefore described is well suited to fulfill the objects primarily stated and it is to be understood that the embodiments of the invention herein shown and described are susceptible to variation, modification, and change within the spirit and scope of the sub-joined claims.

Having described my invention, I claim:

1. In a device of the class described, in combination, a base, load supporting lever mechanism comprising a lever of the first order and a lever of the third order, mounted thereon, each of said levers having fulcrum, load and power pivots, said lever of the first order also having an intermediate pivot, a link connecting the intermediate pivot of said lever of the first order and the power pivot of said lever of the third order, a fulcrum bracket adjustably mounted on said base, said bracket having a pair of laterally extending pivots, a compression stirrup having a pair of bearings for engaging said laterally extending pivots of said bracket, and a single bearing engaging the fulcrum pivot of said lever of the third order.

2. In a device of the class described, in combination, load receiving mechanism, automatic pendulum load counterbalancing mechanism and indicating means in co-operative relation to each other, a unit weight mechanism adapted to manually actuate said unit weight, said load receiving mechanism comprising a lever of the first order and a lever of the third order, said levers having fulcrum, load and power pivots, said power pivot of said lever of the first order operatively engaging said automatic load counterbalancing mechanism and means adjacent said power pivot of said lever of the first order for supporting said unit weight, a spider resting on said load pivots and overlying said levers, said levers and spider lying substantially in common vertical plane.

3. In a device of the class described, in combination, a base, load receiving mechanism mounted upon said base, said load receiving mechanism comprising a lever of the first order and a lever of the third order, said lever of the first order being fulcrumed upon supports extending from said base, a fulcrum bracket having laterally extending pivots secured to said base, said lever of the third order underlying said lever of the first order and being connected to said lever of the first order by a link and fulcrumed by means of a compression stirrup on pivots projecting from said fulcrum bracket, said compression stirrup comprising a triangular frame and a bearing pivotally mounted in each of the corners of said frame.

4. In a device of the class described, in combination, weighing mechanism, automatic load counterbalancing and indicating means connected thereto, manually manipulative load counterbalancing means in operative relation thereto, indicating means actuated thereby, said automatic indicating means comprising a rotatable cylindrical chart and said indicating means for said manipulative load counterbalancing means including a two-armed member pivoted below said chart and having portions extending above the plane of the lower edge of said cylindrical chart.

5. In a device of the class described, in combination, weighing mechanism, automatic load counterbalancing and indicating means connected thereto, manually manipulative load counterbalancing means in operative relation thereto, indicating means actuated thereby, said automatic indicating means comprising a rotatable cylindrical chart and said indicating means for said manipulative load counterbalancing means including a two-armed member pivoted below said chart and having portions extending above the plane of the lower edge of said cylindrical chart, the ends of said upwardly extending portions having surfaces which bear indicia, denoting weights of loads offset by said manipulative load counterbalancing means.

6. In a device of the class described, in combination, load receiving means, automatic load counterbalancing means operatively connected thereto, automatic indicating means actuated thereby, manipulative load offsetting and indicating means, associated with said automatic means, to augment the weighing capacity of said device, said manipulative load offsetting means comprising a lever, a unit weight adapted to be placed on said receiving means and to be removed therefrom by said lever, said automatic indicating means including a cylindrical chart adapted to rotate about an axis, said manipulative load offsetting indicating means including an indicia bearing member adapted to rotate about an axis perpendicular to said axis of rotation of said cylindrical automatically indicating chart and means operatively connected to said unit weight actuating lever for rotating said manipulative load offsetting indicating means.

7. In a device of the class described, in combination, load receiving means, automatic load counterbalancing means operatively connected thereto, automatic indicating means actuated thereby, manipulative load offsetting and indicating means associated with said automatic means to augment the weighing capacity of said device, said manipulative load offsetting means comprising a lever, a unit weight adapted to be placed on said receiving means and to be removed therefrom, by said lever, said automatic indicating means including a cylindrical chart adapted to rotate about an axis, said manipulative load offsetting indicating means including an indicia bearing member adapted to rotate about an axis perpendicular to said axis of rotation of said cylindrical automatically indicating chart and means operatively connected to said unit weight actuating lever for rotating said manipulative load offsetting indicating means, said manipulative load offsetting indication actuating means including a link pivotally secured to said unit weight actuating lever and a crank-like member.

8. In a device of the class described, in combination, automatic load counterbalancing mechanism a part thereof having a serrated face, manipulative load offsetting means associated therewith, means including a kerfed disc-like rotatable member for actuating said manipulative load offsetting means, means for automatically locking said automatic load counterbalancing mechanism when said manipulative load offsetting means are being actuated, said locking means comprising a member, adapted to embrace said kerfed disc-like member a part of said embracing member thereof being adapted to enter the kerfs, a rod like member mounted for slidable movement connected to said embracing member and having serrations on its end, said serrations being adapted to engage said serrated face of said automatic load counterbalancing mechanism part.

9. In a device of the class described, in combination, automatic load counterbalancing mechanism a part theerof having a serrated face, manipulative load offsetting means associated therewith, means including a kerfed disc-like rotatable member for actuating said manipulative load offsetting means, means for automatically locking said automatic load counterbalancing mechanism when said manipulative load offsetting means are being actuated, said locking means comprising a member adapted to embrace said kerfed disc-like member, and a rod like member mounted for slidable movement connected to said embracing member and having serrations on its end, said serrations being adapted to engage said serrated face of said automatic load counterbalancing mechanism part said rod like member being constrained to move in a path parallel to a horizontal axis passing through said disc-like member.

HALVOR O. HEM.